Sept. 29, 1936. R. W. DINZL 2,055,787
MULTILOAD RANGE INDICATING SYSTEM
Filed Dec. 23, 1933 2 Sheets-Sheet 1
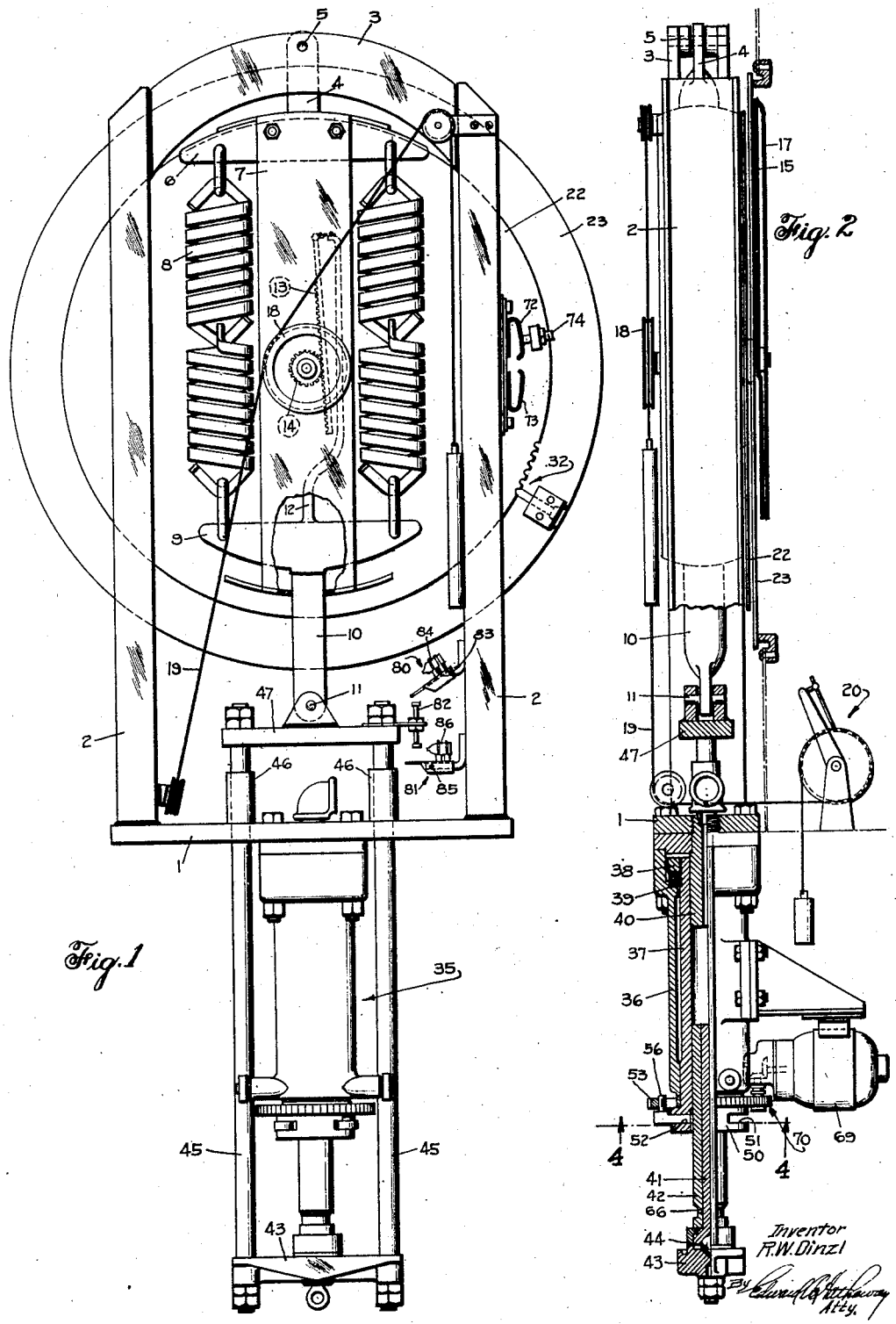

Sept. 29, 1936.   R. W. DINZL   2,055,787
MULTILOAD RANGE INDICATING SYSTEM
Filed Dec. 23, 1933   2 Sheets-Sheet 2
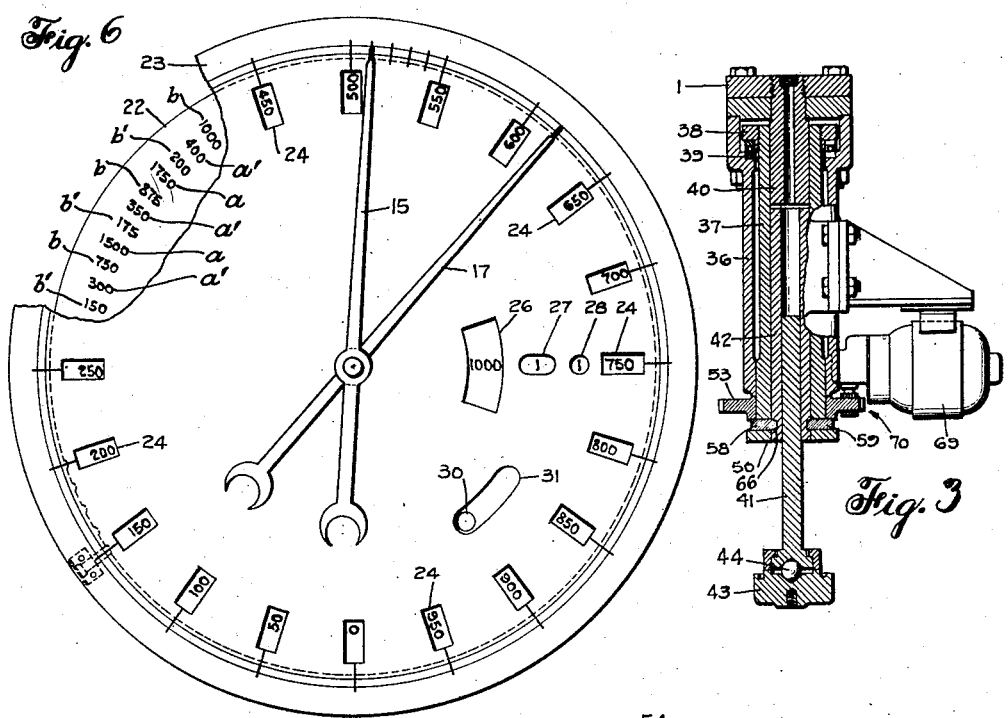
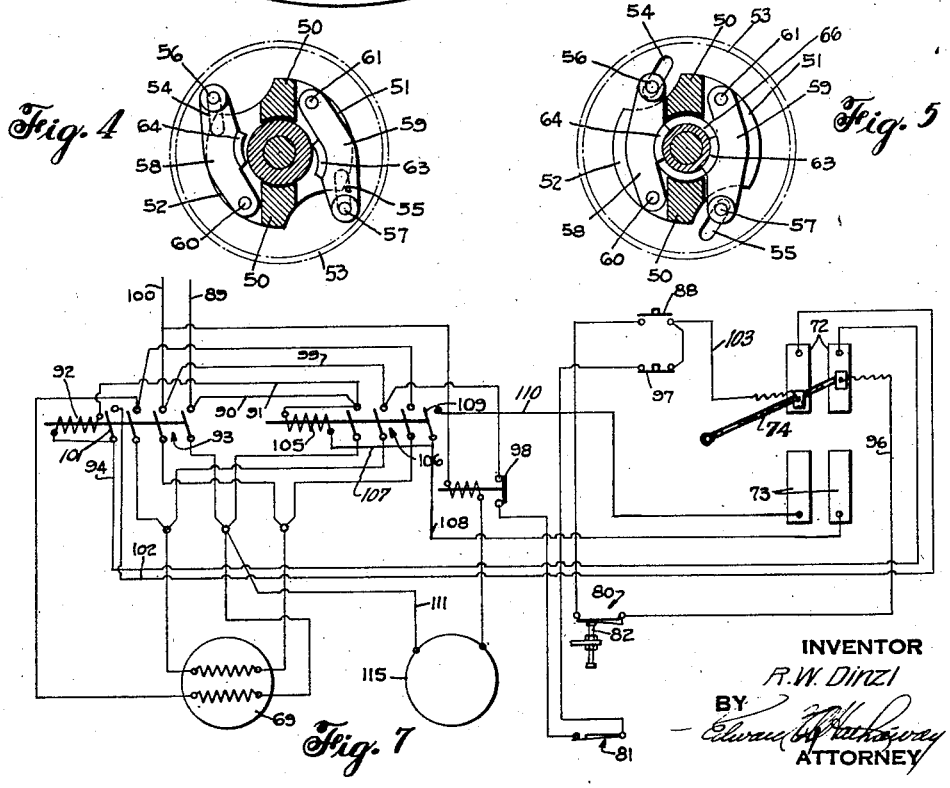
INVENTOR
R. W. Dinzl
BY
ATTORNEY Patented Sept. 29, 1936

2,055,787

UNITED STATES PATENT OFFICE 2,055,787

MULTILOAD RANGE INDICATING SYSTEM

Richard W. Dinzl, Narberth, Pa., assignor to Baldwin-Southwark Corporation, a corporation of Delaware Application December 23, 1933, Serial No. 703,861

17 Claims. (Cl. 265—47)

This invention relates generally to multi-load range indicating systems for weighing apparatus and more particularly to improved means for changing the load range of an indicating system for materials testing machines especially of the hydraulic type.

As disclosed more fully in the application of Gerd S. von Heydekampf, Serial No. 678,240, filed June 29, 1933, it is desirable in load weighing apparatus, such as materials testing machines, to have a multi-load range indicating system, whereby for different maximum loads the indicating mechanism, such for example as a pointer and dial, will be employed throughout its full range of movement. If the indicating and weighing system were adapted for only one load range, then when small loads were weighed the pointer would travel around only a part of the dial distance, and the dial graduations would represent the same load value irrespective of whether the load being weighed were large or small.

Inasmuch as an error in reading will cause a greater percentage error for small maximum loads than for large maximum loads, it is desirable to increase the movement of the pointer for a given increment of load when measuring small loads and thereby facilitate more accurate reading or recording.

In the specific embodiment of the invention shown herein the indicating mechanism is hydraulically actuated through a fluid pressure load transmitting means, the hydraulic pressure being a function of the load applied to a specimen in a materials testing machine. To change the load range of the system, the hydraulic responsive means or load transmitting means is provided with a variable pressure area, specifically a plurality of concentric plungers adapted to be connected together for simultaneous movement to present a large pressure area or to be arranged so that only one plunger is responsive, thus presenting a relatively small pressure area.

Inasmuch as the plungers when operating either simultaneously or alone react against the same weighing spring, it is seen that a relatively small fluid pressure per square inch will be required to move both plungers against the spring as the total pressure force acting on the combined plunger areas would be relatively large whereas a proportionately greater fluid pressure per square inch will be required to move only one plunger against the spring due to the smaller area of the single plunger. Hence by changing the areas, it is possible to have different load ranges.

It is one object of my invention to provide improved means for variably controlling a load transmitting means so as to obtain a plurality of load ranges, another object in this respect being to accomplish this variation automatically in accordance with the setting of an indicating dial or mechanism for one load range or another.

A further object is to provide, in combination with a multi-range pressure transmitting mechanism, improved means for varying the pressure area thereof, preferably automatically as above mentioned.

A still further object is to provide an improved pressure actuated load transmitting multi-plunger device and means for permitting either one or more of said plungers to be responsive to the load pressure. Another object in this respect is to provide an improved clutch for rendering said plungers simultaneously or independently operable automatically in accordance with a predetermined setting of the indicating mechanism.

A more specific object of the invention is to provide an improved clutch mechanism as above set forth actuated by a reversible motor, in turn controlled by a reversing switch which is associated with the indicating dial whereby when the dial is shifted to indicate different load ranges, the motor is actuated in one direction or the other to effect proper selection of the plungers.

A further object is to provide improved means for limiting the maximum movement of the plungers.

Other objects and advantages will be more apparent to those skilled in the art from the following description of the accompanying drawings in which:

Fig. 1 is a rear elevational view of the load weighing system and load transmitting mechanism;

Fig. 2 is a side view of Fig. 1 with parts broken away to show details of construction and also to show details of construction of the weighing system while the load transmitting mechanism is shown in half section in position for simultaneous operation of both plungers;

Fig. 3 is a vertical section through the load transmitting plunger mechanism in position to allow only one plunger to be responsive;

Figs. 4 and 5 are horizontal sections through the automatic clutch mechanism taken substantially on the line 4—4 of Fig. 2 and showing the clutch in its engaged and disengaged positions respectively;

Fig. 6 is a front view of the indicating mechanism with part of the window dial broken away to show load range values on the adjustable index dial;

Fig. 7 is a wiring diagram showing the manner for controlling the plunger clutch automatically in accordance with different load settings of the indicating mechanism.

In the particular embodiment of the invention which is disclosed herein merely for the purpose of illustrating one specific form among possible others that the invention might take, I have shown a load weighing and load transmitting system generally similar to that disclosed in said von Heydekampf application. Hence it will suffice to describe the system only generally although my particular improvements will be described in detail. It will of course be understood that the load weighing system is especially applicable to materials testing machines of the hydraulic type, although other uses and applications are within the purview of this invention.

As shown in Fig. 1 the load weighing system includes generally a base 1 having uprights 2 connected by a crosshead 3. A link 4 pivotally supported at 5 on crosshead 3 supports a crosshead 6 and depending side guides 7. Any suitable weighing springs 8 are supported at their upper ends by crosshead 6 and are connected at their lower ends to a movable crosshead 9, which is guided between guides 7. A tongue 10 projects downwardly from crosshead 9 preferably as an integral part thereof and is pivotally connected as at 11 to a load transmitting means to be described presently.

To indicate the load weighed by springs 8, there is provided an arm 12 projecting upwardly from crosshead 9 and flexibly supporting a rack 13 which engages a pinion 14. This pinion is secured to a shaft of a load indicating pointer 15 (Fig. 6) while a maximum load hand 17 is also journalled concentrically to the pinion shaft. If desired, any suitable drum recording mechanism may be actuated from a pulley 18 connected to the pinion shaft thereby to move a string or other flexible element 19 to actuate a drum recording mechanism generally indicated at 20, Fig. 2.

Inasmuch as the present invention is directed to a multi-range weighing and indicating system, any suitable dial or drum type indicating mechanism may be used, although for purposes of illustration there is shown herein a rotatably adjustable index plate or disk 22 and a normally fixed window plate 23, these two plates or dials being coaxially mounted about the shaft of pinion 14. As disclosed in said von Heydekampf application, the index disk is provided with various multiples of load ranges grouped generally as $a$, $a'$, $b$ and $b'$, Fig. 6. Two of these multiples are effected merely by replacing the springs 8 with other springs of larger or smaller capacity, while the other two multiples are effected by a multi-plunger transmitting mechanism to be described presently. The dial 23 is preferably opaque and is provided with a series of windows 24 to uncover only the particular range index to be used. Other features include a window 26 by which the particular load range employed is disclosed, while other windows 27 and 28 indicate the capacity of springs 8 to be used and to indicate whether both or only one plunger of the transmitting system should be in operation. Index plate 22 is moved to different load ranges by the provision of a finger hole 30, access to which may be had through an arcuate slot 31 in the window dial 23. A detent mechanism generally indicated at 32, Fig. 1, is adapted to hold the index dial 22 in any one of its angularly adjusted positions.

The load transmitting mechanism includes a multi-plunger system generally indicated at 35, Figs. 1, 2 and 3. This mechanism includes an outer stationary casing 36 secured to base 1. An internal rotating cylinder or sleeve 37 is axially supported by a flange 38 journalled on a radial ball bearing 39. Flange 38 is preferably threadedly secured to sleeve 37. The upper end of sleeve 37 is internally guided by a hollow shaft 40 while the lower end is externally guided by casing 36. The multi-range hydraulically responsive plungers include a central plunger 41 telescopically disposed in a concentric outer plunger 42, which in turn is supported in rotating cylinder 37. The inner plunger 41 rests on a crosshead 43 as through a ball 44. Extending upwardly from crosshead 43 is a pair of side rods 45 passing through suitable spacing collars 46, the upper ends of these rods being connected to a crosshead 47 to which tongue 10 is pivotally connected as at 11.

To weigh large maximum loads, plunger 41 is arranged to be responsive by itself, thereby requiring a large fluid pressure per square inch to move the relatively small area of plunger 41 downwardly against springs 8. To measure relatively small maximum loads, both plungers are arranged to move together, thereby presenting a relatively large plunger area which permits a relatively small fluid pressure per square inch to move the plungers more easily against the load weighing springs 8. Hence the indicating pointer 15 will be more easily moved throughout its full angular extent than if only the single central plunger 41 were employed. In combination with this arrangement, it is desirable to eliminate friction of rest between the plunger and its cooperating cylinder 37, and it is for this reason that said cylinder is rotatably mounted. It is also necessary that in case only the central plunger 41 is rendered responsive, rotation should occur between the two plungers, thereby eliminating friction of rest between the same.

To accomplish rotation of the weighing sleeve 37 and thereby eliminate friction of rest, and also to control the selection of one or both plungers 41 and 42 automatically in accordance with a selected load range, I have provided the following improved arrangement of elements. Rotating sleeve 37 is provided with a lower flanged end 50 having a pair of horizontal slots 51 and 52 on opposite sides. A gear 53 is freely journalled on the upper side of said flange 50 and beneath the lower end of stationary casing 36. This gear is provided with a pair of angular slots 54 and 55 for cooperation with clutch operating pins 56 and 57. These pins project upwardly from a pair of clutch members 58 and 59 disposed within slots 51 and 52 and respectively pivoted therein at 60 and 61, these pivot pins 60 and 61 being carried by the flanged end 50. The inner faces of these clutch elements or levers are provided with slightly tapered arcuate clutch portions 63 and 64. The slots 51 and 52 are of sufficient depth as to permit clutch elements 63 and 64 to directly engage an annular groove 66 in the outer plunger 42 when it is desired to render the latter non-responsive to fluid pressure.

A motor 69 is supported upon the outer stationary cylinder 36 in any suitable manner and is adapted through a suitable gear train generally indicated at 70 to rotate gear 53. If motor 69 is rotated in one direction, it is seen that gear 53 and its slots 54 and 55 will cause pins 56 and 57 to move the free ends of clutch arms 58 and 59 outwardly as shown in Figs. 2 and 4. If the motor is rotated in the opposite direction, then the clutch arms will be moved inwardly as shown in Figs. 3 and 5. Before the arms are moved to their inner position, the plungers 41 and 42 are first moved to their upper position to insure that the clutch elements engage annular groove 66 of the outer plunger 42 to prevent downward movement thereof. Inasmuch as the arms are swung inwardly by rotation of the motor, then as the motor continues to rotate, it will not only hold the clutch elements in recess 66 but will also cause rotation of rotatable sleeve 37 and at the same time will rotate plunger 42 relative to the center plunger 41. Friction of rest will therefore be eliminated between the two plungers so that any axial movement of the center plunger will give a true indication of the fluid pressure force representing the load of the testing machine.

If it is desired to allow both plungers to be responsive to the load pressure, then motor 69 is rotated in the opposite direction, thereby automatically releasing the clutch elements 58 and 59 from groove 66, such as shown in Figs. 2 and 4. Continued rotation of the motor in that same direction causes pins 56, 57, arms 58, 59 and pins 60, 61 to rotate sleeve 37 about the plunger 42 and thereby eliminate friction of rest between the same.

From the foregoing disclosure it is seen that I have provided an extremely effective means for changing the pressure responsive system from one load range to another while at the same time eliminating friction of rest between the co-operating plunger and cylinder elements. Viewed in another aspect it is seen that I have provided power means for varying the pressure responsive area of a multi-load range system.

*Operation.*—To control the direction of rotation of motor 69 automatically in accordance with a predetermined load range setting of the indicating system, I have provided as shown in Fig. 1 a pair of switch contacts 72 and 73 supported on one of the vertical standards 2. A switch element 74 is supported upon the adjustable index disc 22 whereby one or the other of said sets of contacts is closed depending upon which load range is employed. Assuming that the machine has been operating with both plungers 41 and 42 responsive to fluid pressure so that clutch elements 58 and 59 are in their unclutched position as shown in Fig. 4 and that switch 74 is in engagement with contacts 72 as shown in Fig. 1, then if it is desired to change the load range of the machine so that only the central plunger 41 is responsive, it is first necessary to release the plunger pressure to allow upward movement of the plunger to a point where annular groove 66 is in alignment with clutch arms 58 and 59. To insure this upper position of the plungers before motor 69 is reversed, there is provided upper and lower limit switches 80 and 81 supported on stationary standard 2 while an adjustable pin 82 carried by crosshead 47 is adapted to engage switch 80 to raise the same about a pivot 83 upwardly to a horizontal closing position. This switch is preferably a mercury tube 84, and its weight will normally tilt the switch downwardly to open its contacts. Switch 81 is pivoted about its forward end at 85 so that the weight of the mercury switch 86 will maintain the same in a horizontal closed position. With the plungers in their upper position so that switch 80 is closed by pin 82, as shown in wiring diagram of Fig. 7, the motor 69 may be reversely rotated by manually closing momentary contact switch 88, whereupon current flows from one side of the main line 89 through wires 90 and 91 to energize coil 92 and close its switch 93, and thence through wire 94 and one of contacts 72 to wire 96, thence across switches 80, 88, 97 and 81, and across normally closed thermal relay 98 to wire 99 on the other side of the line 100. Immediately upon closure of switch 93, the motor 69 will be supplied with current from lines 89 and 100 so as to cause reverse rotation thereof, thereby to cause cam slots 54 and 55 to move clutch levers 58 and 59 into engagement with annular groove 66 and thus hold outer plunger 42. This motor, of course, continues to rotate, thereby to rotate simultaneously cylinder sleeve 37 and outer plunger 42 and thus eliminate friction of rest between the plungers 41 and 42. Either upon opening of starting switch 88 or upon admission of fluid pressure to cylinder 37 so that the center plunger 41 moves downwardly to cause opening of limit switch 80, the motor circuit will continue to be closed due to closure of a holding switch 101 associated with the main line switch 93. The circuit through this holding switch is from coil 92, across switch 101, to wire 102, thence through the left contact of switch 72 to wire 103, across switches 97 and 81 and back to the other side of the line 89.

If the double plunger is to be used to permit a different load range, the index disk 22 is shifted so that switch 74 closes contacts 73. However, it is again necessary first to relieve the hydraulic load and return the plunger 41 to its uppermost position so as to reclose limit switch 80. In shifting the switch 74, it will break the circuit for main switch coil 92, thereby opening the switch and stopping motor 69. However, with switch 74 in its down position, then upon closure of momentary switch 88, current will flow from line 89, wire 90, switch coil 105, to close a switch 106, the circuit continuing through wires 107 and 108 to the right contact of switch 73 and wire 96, thence across switches 80, 88, 97, etc. to the other line 100. The motor will thereupon reverse its rotation and cause cam slots 54 and 55 to move arms 58 and 59 outwardly to release the outer plunger 42. Upon opening of switch 88 or upon admission of pressure to the sleeve 37 so that the plungers move downwardly and thus open switch 80, the motor circuit remains closed due to closure of a holding circuit switch 109. This circuit is supplied with current from switch coil 105, thence through wires 107 and 110 to the left contact of switch 73, thence to wire 103, and across switches 97, 81, etc. to the other side of the line 100.

To limit the downward movement of the plungers so as to avoid an excessive force being applied to the weighing system, switch 81, Fig. 1, is opened by pin 82 when the plungers reach a predetermined lower position. Inasmuch as the circuit for either position of switch 74 passes through switch 81, it is seen that the opening thereof will open the circuit for either of the main switches 92 or 105. This will cause complete shutdown of the rotating motor 69 and also discontinue the supply of fluid pressure to the hydraulic system because a motor 115 for driving a fluid pump is connected through switches 93 and 106 as by wire 111, the other wire from the motor passing through the coil of thermal relay 98 and thence to the other side of the main line. If for any reason the main pump motor 115 becomes overloaded, thermal relay will open and thereby shut down all motors by opening of either switch 93 or 106.

Also in adjusting the dial mechanism so as to obtain a different load range by varying the plunger area, the switch 74 in passing from contact 72 to 73 will disconnect the circuit which closes either main switch 93 or 106 thereby breaking the circuit for the pump motor 115. The fluid pressure will thereupon drop and the weighing springs 8, Fig. 1, will return the plungers to their uppermost position. Hence, when the motor 69 is reversed, the plungers will already have been moved to their upper position, thus permitting free clutch movement.

Hence it is seen that very efficient means have been provided for automatically changing the pressure responsive area in accordance with a predetermined load range setting of the indicating system while at the same time fully protecting the system against excessive testloads. Also the multiple plungers must be returned to a given position before they may be connected together or disconnected, thus providing a complete safeguard to the system. These features are obtained while at the same time, and with a substantial portion of the same mechanism, eliminating friction of rest between the plungers and their immediately surrounding surface.

It will of course be understood that various changes in details of construction and arrangement of parts may be made by those skilled in the art without departing from the spirit of the invention as set forth in the appended claims.

I claim:

1. A multi-load range indicating system comprising, in combination, a plurality of hydraulic load transmitting elements adapted to be selected for variable load ranges, a load dial mechanism adjustable for corresponding load ranges, and means for automatically causing said dial and said selected load transmitting mechanism to be operative for the same load range.

2. A multi-load range indicating system comprising, in combination, a plurality of load responsive elements, motor operated means for selectively controlling said elements to effect different load ranges, a dial indicating system adapted to be adjusted for different load ranges, and means for controlling said motor to effect different load selections automatically in accordance with adjustments of said load dial mechanism.

3. A multi-load range indicating system comprising, in combination, a hydraulic load transmitting means having a plurality of pressure operated plungers, and motor operated means for selectively controlling said plungers thereby to effect different load ranges.

4. A multi-load range indicating system comprising, in combination, a hydraulic pressure responsive means having variable pressure areas, an adjustable multi-load indicating mechanism, and means for changing said pressure areas automatically in accordance with a load range selected by adjustment of said load indicating mechanism.

5. A multi-load range indicating system comprising, in combination, a plurality of load responsive plungers, and power operated means for selectively rendering one or more of said plungers operative thereby to effect different load ranges.

6. The combination set forth in claim 5 further characterized in that said power means includes a reversible motor adapted to effect one load range for one direction of motor rotation and another load range during opposite motor rotation.

7. A multi-load range indicating system comprising, in combination, a plurality of load responsive plungers, power operated means adapted to render one or more of said plungers operative to effect different load ranges, an indicating dial mechanism adapted to be adjusted for different load ranges, and means for coordinating the operation of said power means and dial mechanism whereby they are adapted to be operative for the same load range automatically upon adjustment of the system from one load range to another.

8. The combination set forth in claim 5 further characterized in that said power means includes a reversible motor adapted to effect one load range for one direction of motor rotation and another load range during opposite motor rotation, a dial indicating system adapted to be adjusted for different load ranges, and a reversing switch controlled by said dial mechanism whereby for different load range adjustments thereof said motor is automatically controlled so as to rotate in one or the other of opposite directions thereby to select the proper plunger operation for the particular load range.

9. A multi-load range indicating system comprising, in combination, a plurality of pressure operated reciprocable plungers, a cylinder therefor, and motor operated means for rendering one or more of said plungers operative while at the same time effecting relative rotation between the plungers and said cylinder to eliminate friction of rest therebetween.

10. The combination set forth in claim 9 further characterized in that said motor operated means is reversible and one or more of said plungers are rendered operative in accordance with the direction of rotation of the motor.

11. A multi-load range indicating system comprising, in combination, a plurality of concentric fluid actuated reciprocable plungers, a rotatable sleeve in which said plungers are disposed, and cam controlled clutch means for connecting said plungers together or disconnecting one from the other.

12. The combination set forth in claim 11 further characterized by the provision of a reversible motor for operating said cam controlled clutch means, said clutch means connecting said plungers together upon one direction of rotation of said motor and disconnecting said plungers upon reverse direction of rotation.

13. The combination set forth in claim 11 further characterized by the provision of a reversible motor for operating the cam controlled clutch means, said clutch means being reversely operable by said motor and adapted to effect clutching or unclutching of said plungers automatically in accordance with the direction of rotation of said motor, and means whereby upon continued rotation of said motor in either direction friction of rest will be eliminated for either of said plungers.

14. A multi-load range indicating system comprising, in combination, a plurality of concentrically disposed fluid actuated reciprocable plungers, a rotatable sleeve cylinder in which said plungers are disposed, radially movable clutch means carried by said sleeve and adapted to releasably engage the outer one of said plungers, a gear disposed concentrically of said sleeve for partial angular movement relative thereto, and cam means operatively connecting said clutch and gear whereby upon rotation of said gear in one direction said clutch is moved inwardly to engage said outer plunger and hold the same in its normally inactive position against reciprocation while upon reverse rotation of said gear said clutch means disengages said outer plunger to render the same operative.

15. The combination set forth in claim 14 further characterized by the provision of means whereby at least said outer plunger must be returned to its normal inactive position before the clutch means may be operated to clutch or unclutch said outer plunger.

16. A load indicating system comprising, in combination, a plurality of pressure actuated reciprocable plungers adapted to have active and inactive positions, means for selectively connecting said plungers together or disconnecting the same to effect different load ranges, a source of fluid pressure for actuating said plungers, and means whereby said plungers must be returned to their inactive position before the same may be connected or disconnected.

17. A multi-load range indicating system comprising, in combination, a load responsive means having a plurality of pressure responsive areas representing different load ranges and having active and inactive positions, a source of fluid pressure for actuating said responsive means, a load weighing system against which said load responsive means reacts during application of fluid pressure whereby the release of said fluid pressure permits the load weighing system to return the load responsive means to its normally inactive position, and means whereby said weighing system to return said pressure responsive means must be returned to its normally inactive position before the different pressure areas may be selected.

RICHARD W. DINZL.